United States Patent
Hagiwara et al.

(10) Patent No.: US 12,171,250 B2
(45) Date of Patent: Dec. 24, 2024

(54) COOKED-RICE IMPROVER HAVING FLAVOR IMPROVING ACTION

(71) Applicants: Mizkan Holdings Co., Ltd., Handa (JP); Mizkan Co., Ltd., Handa (JP)

(72) Inventors: Kenta Hagiwara, Nagoya (JP); Natsuko Yoshida, Handa (JP); Yuhei Takayama, Obu (JP)

(73) Assignees: Mizkan Holdings Co., Ltd., Handa (JP); Mizkan Co., Ltd., Handa (JP)

( * ) Notice: Subject to any disclaimer, the term of this patent is extended or adjusted under 35 U.S.C. 154(b) by 557 days.

(21) Appl. No.: 15/769,960

(22) PCT Filed: Jul. 8, 2016

(86) PCT No.: PCT/JP2016/070226
§ 371 (c)(1),
(2) Date: Apr. 20, 2018

(87) PCT Pub. No.: WO2017/068818
PCT Pub. Date: Apr. 27, 2017

(65) Prior Publication Data
US 2018/0303142 A1    Oct. 25, 2018

(30) Foreign Application Priority Data
Oct. 22, 2015    (JP) .............................. 2015-207648

(51) Int. Cl.
*A23L 27/00* (2016.01)
*A23L 7/10* (2016.01)
*A23L 7/196* (2016.01)
*A23L 29/30* (2016.01)

(52) U.S. Cl.
CPC ................ *A23L 27/88* (2016.08); *A23L 7/10* (2016.08); *A23L 7/1963* (2016.08); *A23L 7/1965* (2016.08); *A23L 29/35* (2016.08); *A23V 2002/00* (2013.01)

(58) Field of Classification Search
None
See application file for complete search history.

(56) References Cited

U.S. PATENT DOCUMENTS

| | | | | |
|---|---|---|---|---|
| 4,840,807 A | * | 6/1989 | Yoshida | C07H 1/08 127/40 |
| 5,614,245 A | | 3/1997 | Gupta et al. | |
| 2004/0258831 A1 | | 12/2004 | Zhao et al. | |
| 2009/0274815 A1 | * | 11/2009 | Kobayashi | A23P 20/12 426/578 |
| 2011/0200706 A1 | * | 8/2011 | Yamada | C12N 9/1044 426/10 |
| 2012/0045562 A1 | | 2/2012 | Watanabe et al. | |
| 2012/0045564 A1 | * | 2/2012 | Tachibe | A23L 29/219 426/618 |
| 2013/0189420 A1 | * | 7/2013 | Tachibe | A23L 29/219 426/618 |
| 2015/0025158 A1 | | 1/2015 | Skorge et al. | |

FOREIGN PATENT DOCUMENTS

| | | |
|---|---|---|
| CN | 101659815 A | 3/2010 |
| CN | 104432111 A | 3/2015 |
| JP | 2001-294601 A | 10/2001 |
| JP | 2002-354992 A | 12/2002 |
| JP | 2010-053281 A | 3/2010 |
| JP | 2010-077573 A | 4/2010 |
| JP | 4659143 B | 3/2011 |
| JP | 2012-117177 A | 6/2012 |
| JP | 2013-106564 A | 6/2013 |
| JP | 2015-123003 A | 7/2015 |
| TW | 201043147 A | 12/2010 |
| TW | 201531233 A | 8/2015 |
| WO | WO 2009/066514 A1 | 5/2009 |
| WO | WO 2010/131456 A1 | 11/2010 |

OTHER PUBLICATIONS

Ishihara: Functions of Gum Arabic and Soybean Soluble Polysaccharide in Cooked Rice as a Texture Modifier; Biosci. Biotechnol. Biochem., 74 (1), 101-107, 2010 (Year: 2010).*
Watanabe: WO 2010/131456, published Nov. 18, 2010 (Year: 2010).*
Takagi: WO 2015/098541; published Jul. 2, 2015 (Year: 2015).*
Chang: Effects of molecular size and structure of amylopectin on the retrogradation thermal properties of waxy rice and waxy cornstarches; Food Hydrocolloids 21 (2007) 645-653. (Year: 2007).*
Poste: Laboratory methods for sensory analysis of food, published 1991. (Year: 1991).*
Sommermeyer: Method of producing starch decomposition products; Publication No. CN 1081642 C Published on Mar. 27, 2002 Application No. CN 95195412 A Filed on Sep. 26, 1995. (Year: 2002).*
Supplementary European Search Report in corresponding European Application No. EP 16 85 7136, dated Apr. 11, 2019.

* cited by examiner

*Primary Examiner* — Patricia A George
(74) *Attorney, Agent, or Firm* — Knobbe Martens Olson & Bear LLP

(57) ABSTRACT

This invention provides a cooked-rice improver having flavor sustaining and/or flavor enhancement effects of cooked rice. The improver is obtained by mixing low-decomposition starch having a predetermined molecular weight and dextrin having a predetermined DE value at a predetermined ratio. This invention provides a cooked-rice improver flavor sustaining and/or flavor enhancement actions on cooked rice, and cooked rice produced by using the same. The cooked-rice improver contains low-decomposition starch having the molecular weight of 500,000 to 5,000,000 and dextrin having a DE value greater than one and equal to or lower than fifty at a ratio of 1:9 to 9:1 in a mass ratio.

17 Claims, No Drawings

COOKED-RICE IMPROVER HAVING FLAVOR IMPROVING ACTION

TECHNICAL FIELD

This invention relates to a cooked-rice improver having flavor improving action and a method of producing the same, cooked rice in which the flavor thereof has been improved and a method of producing the same, and a method of improving the flavor of cooked rice.

BACKGROUND ART

Recently, a lifestyle known as "Ready-Made Meal" (e.g., home-meal replacement (HMR)), has become popular. With the life style, people purchase pre-cooked food such as a bento, sushi, and side dishes at a grocery store or a convenience store and eat them at home. It often takes a few or several hours for the consumers to eat these pre-cooked foods prepared as "Ready-Made Meal" after cooking. In case of cooked rice containing acetic acid (e.g., sushi rice), the preferable sourness and flavor, such as smell, sweetness, and/or umami, of the sushi rice decreases and deteriorates with the lapse of time after the production thereof, disadvantageously. Even in case of cooked rice without acetic acid (e.g., cooked white rice) that is used, for example, for a bento or a rice ball, the flavor such as smell, sweetness, and/or umami of the just-cooked rice (i.e., rice immediately after cooking) decreases and deteriorates with the lapse of time after production thereof, disadvantageously. In this specification, the "cooked rice without acetic acid" means not only the cooked rice that does not contain any acetic acid but also the cooked rice that contains such a small amount of acetic acid that hardly gives sourness to the consumer.

In order to suppress the decrease or deterioration in the flavor of the rice (or sushi rice) during the distribution and storage thereof, a Patent Literature 1 teaches a technique in which, for example, 3-methylthiopropionic acid ethyl is added into rice vinegar within the concentration range of 0.006 to 0.2 ppb. With this technique, it is possible to dramatically prevent the decrease in the sourness of sushi rice with the lapse of time. However, the Patent Literature 1 is silent about the suppression or prevention of the other flavor such as smell, sweetness, and/or umami that decides the deliciousness of rice. Thus, there is a room to improve and overcome the disadvantage mentioned above. Further, the Patent Literature 1 teaches a technique that is applicable to only rice vinegar. As a result, the taste and/or flavor to which the technique taught by Patent Literature 1 is applicable are limited.

Another conventional technique teaches about frozen sushi. With this technique, sushi is distributed to each destination in frozen state and defrosted at home. However, by freezing process, the texture, and flavor of sushi is unavoidably decreased and deteriorated. In addition, it inconveniently takes a long time to defrost the frozen sushi at a room temperature. With a microwave, it is possible to shorten the time to defrost the frozen sushi but it results in heating unevenness and greatly impairing flavor of the sushi.

CITATION LIST

Patent Literature

Patent Literature 1: WO2009/066514 A1

SUMMARY

Technical Problem

An object of the present invention is to provide a technique capable of suppressing decrease or deterioration in the flavor of rice and sushi rice with the lapse of time after production. To be specific, the technique of the present invention is capable of suppressing decrease or deterioration in the flavor such as smell, sweetness, and/or umami that decides the deliciousness of rice and in the taste and flavor of sushi rice such as sourness. Additionally, the technique of the present invention is capable of achieving the loosening property and form-retention ability of cooked rice as basic and necessary requirements such that it is possible to distribute and store the cooked rice without freezing.

Solution to Problem

The inventors of the present invention repeatedly performed diligent studies to overcome the problems in the prior arts as described above. As a result of the studies, the inventors found out that the flavor and/or the flavor sustainability of the cooked rice is remarkably improved by adding a mixture, which is obtained by mixing low-decomposition starch having a specific molecular weight and dextrin having a specific DE value at a specific mass ratio, into the rice. The inventors have completed the present invention based on the above knowledge.

The present invention relates to the followings.

(1) A powdered cooked-rice improver containing low-decomposition starch and dextrin at a ratio from 1:9 to 9:1 in a mass ratio.

(2) The powdered cooked-rice improver according to the item (1), wherein a molecular weight of the low-decomposition starch is 500,000 to 5,000,000, and a DE value of the dextrin is greater than one (1) and equal to or lower than fifty (50).

(3) The powdered cooked-rice improver according to the item (1) or (2), wherein a percentage of the powdered cooked-rice improver left on a sifter with a 0.5 mm opening is less than 5%.

(4) A method of producing a powdered cooked-rice improver including a step of mixing low-decomposition starch and dextrin at a ratio from 1:9 to 9:1 in a mass ratio.

(5) A liquid cooked-rice improver including the powdered cooked-rice improver according to any one of the items (1) to (3) and water or seasoning liquid.

(6) The liquid cooked-rice improver according to the item (5), wherein the liquid cooked-rice improver is oil-free and emulsification-free liquid.

(7) A method of producing a liquid cooked-rice improver including a step of adding the powdered cooked-rice improver according to any one of the items (1) to (3) into water or into seasoning liquid.

(8) The method of producing the liquid cooked-rice improver according to the item (7), wherein the liquid cooked-rice improver is oil-free and emulsification-free liquid.

(9) A method of producing cooked rice in which the flavor thereof has been improved, wherein an adding amount of the powdered cooked-rice improver according to any one of the items (1) to (3) to rice or an adding amount of the liquid cooked-rice improver according to the item (5) or (6) to the rice is within a range of 0.001% to 1.0% as dry mass of the sum of the low-decomposition starch and the dextrin with respect to raw rice.

(10) The method of producing the cooked rice according to the item (9), wherein the addition of the powdered cooked-rice improver according to any one of the items (1) to (3) or the addition of the liquid cooked-rice improver according to the item (5) or (6) is performed to the raw rice before production or to the cooked rice after production.

(11) The method of producing the cooked rice according to the item (9) or (10), wherein an amount of added water per one pt. mass of the raw rice is set equal to or more than 1.3 pts. mass and equal to or less than 1.8 pts. mass in rice production process.

(12) The method of producing the cooked rice according to any one of the items (9) to (11), wherein the rice is sushi rice.

(13) Cooked rice in which the flavor thereof has been improved, containing the powdered cooked-rice improver according to any one of the items (1) to (3) or of the liquid cooked-rice improver according to the item (5) or (6) within a range of 0.001% to 1.0% as dry mass of the sum of the low-decomposition starch and the dextrin with respect to raw rice.

(14) The rice according to the item (13), wherein the rice is sushi rice.

(15) A method of improving flavor of rice, including a step of adding the powdered cooked-rice improver according to any one of the items (1) to (3) or the liquid cooked-rice improver according to the item (5) or (6) within a range of 0.001% to 1.0% as dry mass of the sum of the low-decomposition starch and the dextrin with respect to raw rice.

Advantageous Effects

With the present invention, which relates to a technique capable of suppressing decrease or deterioration of flavor of rice and sushi rice with the lapse of time, it is possible to suppress the decrease or deterioration of the flavor of the rice such as smell, sweetness, and umami or of the flavor of sushi rice such as sourness. In addition thereto, it is further possible to achieve the loosening property and form-retention ability of cooked rice as basic and necessary requirements such that it is possible to distribute and store the cooked rice without freezing.

DESCRIPTION OF EMBODIMENTS

Hereinafter, the present invention will be described in detail. The first aspect of the present invention is a powdered cooked-rice improver. The improver contains low-decomposition starch and dextrin at a ratio from 1:9 to 9:1 in a mass ratio. In this specification, the term "powdered" may mean powdered or granulated.

Here, the term "low-decomposition starch" in the present invention means starch slightly decomposed. To be specific, the low-decomposition starch is the starch decomposed to the extent that it has water solubility. That is, the starch that is not soluble in water is not included in the meaning of the "low-decomposition starch" of the present invention. It is preferable the solubility herein means an ability to solve the starch in water within 180 minutes at a normal temperature. Further, the "low-decomposition starch" of the present invention has the molecular weight of 500,000 to 5,000,000, preferably 500,000 to 4,500,000, more preferably 500,000 to 4,000,000, and particularly preferably 800,000 to 3,500,000.

Here, the molecular weights were determined by a gel permeation chromatography (GPC analysis) using standard pullulan as a molecular weight marker. To be specific, the weight-average molecular weights were measured with a high-performance liquid chromatography device and a differential refractometer using the column of SUGAR-KS-804 (products from Showa Denko K.K.)+SUGAR-KS-805 (products from Showa Denko K.K.)+SUGAR-KS-806 (products from Showa Denko K.K.). The measurement was carried out under a condition in which sodium nitrate solution of 0.05M was used as eluent, the flow rate was set to 1.0 ml/min., 100 µL of a 1 mass % sample solution was injected thereto, and the temperature was set to 80 deg C. In this specification, the term "weight-average molecular weight" may also simply be referred to as "molecular weight".

In the present invention, "dextrin" means a substance that is derived by decomposing starch to a high degree, is easily soluble in water, and has little viscosity in aqueous solution. To be specific, the dextrin is preferably dissolved within 30 minutes at room temperature and has less viscosity than low-decomposition starch in 10% aqueous solution, preferably equal to or less than 10 Pa·s. Additionally, the DE value of "dextrin" in the present invention is greater than 1 and equal to or smaller than 50, preferably greater than 1 and equal to or smaller than 15. Here, the DE value was measured by means of Somogyi-Nelson method.

The decomposition of the starch may be achieved: by subjecting the starch to a molecular weight-reducing treatment using acid, alkali, or enzyme; by obtaining processed starch through a processing treatment such as etherification and esterification and by subjecting the processed starch to the molecular weight-reducing treatment using acid, oxidizing agent, or enzyme; or by subjecting the starch or the processed starch to the molecular weight-reducing treatment through a physical processing treatment. Here, any "starch" such as corn starch, potato starch, rice starch and wheat starch may be employed in the present invention. Further, the "processed starch" may be, for example, etherified starch, esterified starch, or oxidized starch. To be specific, the processed starch may be hydroxyl propylated starch, hydroxyl propylated phosphate cross-linked starch, or acetylated phosphate cross-linked starch. The "acid" may be oxalic acid or hydrochloric acid. The "enzyme" may be α-amylase or β-amylase. The "physical processing treatment" may be an extruder treatment.

The powdered cooked-rice improver of the present invention contains low-decomposition starch and dextrin at a ratio from 1:9 to 9:1, preferably from 2:8 to 6:4 in a mass ratio. It is not preferable to have the mixing ratio be outside the above range since the flavor of the rice produced with such an improver is decreased and deteriorated with the lapse of 24 hours after the production (i.e., the flavor of the rice does not last long). It should be noted, however, the powdered cooked-rice improver may further contain other food additives in addition to the "low-decomposition starch" and the "dextrin" unless such other additives inhibits the effect of the present invention.

In the powdered cooked-rice improver of the present invention, a percentage of the powdered cooked-rice improver left on a 0.5 mm sifter is preferably less than 5%. With this, the powdered cooked-rice improver is well mixed with the rice. That is, when the powdered cooked-rice improver is put through the sifter having 0.5 mm of openings, the ratio of the improver that does not go through the sifter and thus is left thereon is preferably less than 5% of the whole powdered cooked-rice improver (in mass ratio).

The powdered cooked-rice improver of the present invention contains the low-decomposition starch and the dextrin at a predetermined ratio, and thereby achieves flavor improving action. In this specification, "achieving flavor improving action" means "having flavor lasting or sustaining action" and/or "having flavor enhancing action". Further, in this specification, "having flavor sustaining action" means that the flavor of the rice produced with the powdered cooked-rice improver lasts and is sustained for 24 hours or more (to be specific, for 24 hours) and even for 48 hours or more (to be specific, for 48 hours) after the production in comparison with that of the rice produced without the powdered cooked-rice improver. In this specification, "having flavor enhancing action" meant that the flavor of the rice produced with the powdered cooked-rice improver is strengthened at a time after 24 hours or more (to be specific, for 24 hours) and even at a time after 48 hours or more (to be specific, 48 hours) from the production in comparison with that of the rice produced without the powdered cooked-rice improver.

In the present invention, the term "flavor" means, for example, smell, sweetness, and/or umami of the just-cooked rice (i.e., cooked rice immediately after production). To be specific, the term "flavor" represents smell, sweetness, umami, and the like of the cooked rice containing no acetic acid (e.g., cooked white rice). On the other hand, the term "flavor" represents not only smell, sweetness, umami, and the like but also sourness of the cooked rice containing acetic acid (e.g., sushi rice). It should be noted that in this specification, the "cooked rice containing no acetic acid" means not only the cooked rice that does not contain any acetic acid but also the cooked rice that contains such a small amount of acetic acid that hardly gives sourness to the consumer.

The powdered cooked-rice improver of the present invention contains the low-decomposition starch and the dextrin at the predetermined ratio, and thereby achieves an aging-inhibiting action on the starch of the cooked rice. In this specification, "achieving an aging-inhibiting action" means, with the powdered cooked-rice improver, the soft texture of the just-cooked rice lasts and is sustained for 24 hours or more (to be specific, for 24 hours) and even for 48 hours or more (to be specific, for 48 hours) after production. As a result, looseness and form-retention ability (formability) of the cooked rice are sustained.

In the present invention, the powdered cooked-rice improver may be added into raw rice before cooking or into cooked rice after cooking. A clear difference in the flavor improving action was not found between the cooked rice in which the improver was added before cooking and the cooked rice in which the improver was added after cooking. The powdered cooked-rice improver may be added into the rice solely and independently, or may be added into the rice together with water and other seasoning.

The cooking process used in the present invention may be a conventional process and not limited to any specific process. As the pre-treatment of rice production, raw rice may be washed and immersed in water before the production. However, if the raw rice is so-called wash-free rice, it is not necessary to wash the raw rice. Further, the rice may be cooked with an immersion-free method. There should be no restriction on the varieties of rice to be cooked. For example, wash-free rice may be used.

In the present invention, the addition ratio of the powdered cooked-rice improver to the rice is set within a range of 0.001% to 1.0%, preferably 0.005% to 1.0%, more preferably 0.01% to 0.5% as dry mass of the sum of the low-decomposition starch and the dextrin with respect to the raw rice. It is not preferable to have the addition ratio of the powdered cooked-rice improver be less than the above range since the flavor of the cooked rice decreases after 24 hours from the production (i.e., flavor becomes deteriorated). It is also not preferable to have the addition ratio of the powdered cooked-rice improver be greater than the above range since the consumer may feel the texture and the flavor of the cooked-rice improver, as well as the cost-effectiveness becomes undesirable.

In the present invention, the "cooked rice" may or may not contain acetic acid. In the present invention, the "cooked rice containing no acetic acid" means not only the rice cooked by adding water to the raw rice (i.e., cooked white rice) but also the rice cooked by additionally adding seasoning other than vinegar. Besides, the "cooked rice containing no acetic acid" of the present invention also means the cooked rice containing such a small amount (e.g., less than 0.003 mass %) of acetic acid that hardly gives sourness to the consumer even immediately after the production. As the cooked rice containing no acetic acid, maze-gohan (cooked rice mixed with seasoned ingredients) or takikomi-gohan (rice cooked together with ingredients and seasoning) are preferable, for example.

On the other hand, in the present invention, the "cooked rice containing acetic acid" means not only the rice cooked with vinegar but also the rice cooked with seasoning vinegar, which contains vinegar and seasoning. As the cooked rice containing acetic acid, sushi rice produced by adding the seasoning vinegar, which contains vinegar, saccharide, salt, and the like, into the just-cooked rice is preferable, for example.

The "vinegar" may be brewed vinegar including cereal vinegar, fruit vinegar, and alcoholic vinegar, or synthetic vinegar. The cereal vinegar may be rice vinegar, rice black vinegar, or barley black vinegar, and the fruit vinegar may be apple vinegar or grape vinegar. Preferably, the vinegar may be the brewed vinegar, especially the rice vinegar. The acetic acid concentration of the vinegar used herein is set within the range of about 4.0 to 20.0 (mass/volume) %, which is commonly used. Further, the "seasoning vinegar" used herein is produced by adding several seasoning ingredients into the above-mentioned vinegar.

Next, a second aspect of the present invention relates to a method of producing the powdered cooked-rice improver in the first aspect of the present invention. To be specific, the low-decomposition starch and the dextrin are mixed at a ratio from 1:9 to 9:1 in a mass ratio. Therefore, the description made in the first aspect of the present invention may be repeated in the description for the second aspect of the present invention. That is, the terms "powdered cooked rice improver", "low-decomposition starch", "dextrin", "flavor", "cooked rice", and "vinegar" in the second aspect of the present invention are identical to the terms described in the first aspect of the present invention.

In the production method of the second aspect of the present invention, the mixing ratio of the low-decomposition starch and the dextrin is from 1:9 to 9:1, preferably from 2:8 to 6:4 in the mass ratio. It is not preferable to have the mixing ratio be outside the above range since the flavor of the rice produced with such an improver is decreased and deteriorated with the lapse of 24 hours after the production (i.e., the flavor of the rice does not last long). Here, the process of mixing the low-decomposition starch and the dextrin used in the present invention is not limited to any specific process and may be a conventional process. It should be noted the powdered cooked-rice improver may further contain other food additives in addition to the "low-decomposition starch" and the "dextrin" unless such other additives inhibits the effect of the present invention.

As described above with reference to the first aspect of the present invention, in the production method of the second aspect of the present invention, a percentage of the powdered cooked-rice improver left on a 0.5 mm sifter is preferably less than 5%. With this, the powdered cooked-rice improver is well mixed with the rice. That is, when the powdered cooked-rice improver is put through the sifter having 0.5 mm of openings, the ratio of the improver that does not go through the sifter and thus is left thereon is preferably less than 5% of the whole powdered cooked-rice improver (in mass ratio).

The powdered cooked-rice improver produced by the producing method in the second aspect of the present invention may have the flavor sustaining action and/or the flavor enhancing action, as well as the aging-inhibiting action on the starch.

Next, a third aspect of the present invention relates to a liquid cooked-rice improver. Particularly, the liquid cooked-rice improver contains the powdered cooked-rice improver of the first aspect of the present invention and water or seasoning liquid. To be specific, the liquid cooked-rice improver contains the low-decomposition starch and the dextrin mixed at a ratio from 1:9 to 9:1, preferably from 2:8 to 6:4 in a mass ratio, together with the water or the seasoning liquid. Therefore, the terms "powdered cooked rice improver", "low-decomposition starch", "dextrin", "flavor", "cooked rice", and "vinegar" in the second aspect of the present invention are identical to the terms described in the first aspect of the present invention.

It should be noted the liquid cooked-rice improver may be obtained by mixing the powdered cooked-rice improver of the first aspect of the present invention into water or seasoning liquid, or by separately or independently mixing the powdered low-decomposition starch and the powdered dextrin into water or seasoning liquid so as to achieve the mixing ratio of the low-decomposition starch and the dextrin from 1:9 to 9:1 in the mass ratio. Alternatively, the liquid cooked-rice improver may be obtained by mixing a liquid material containing only the low-decomposition starch and a liquid material containing only the dextrin so as to achieve the mixing ratio of the low-decomposition starch and the dextrin from 1:9 to 9:1 in the mass ratio. Further, the low-decomposition starch and a liquid material may be added into the rice before or after the production so as to obtain the cooked rice in which the low-decomposition starch and the dextrin are contained with the mass ratio of 1:9 to 9:1.

It is preferable to have the liquid cooked-rice improver of the present invention be oil-free and emulsification-free liquid. If the improver contains fats and oil, the looseness of the cooked rice becomes so high that the form-retention ability of the cooked rice may be decreased. Additionally, the calories of the cooked rice become high. Thus, although "being oil-free" is not an important factor to achieve the advantageous effects of the present invention, it is preferable to be "oil-free".

In the present invention, "oil-free" means the improver is substantially free from fat and oil. To be specific, the improver contains less than 0.5% of fats and oil in the mass ratio, i.e., the improver contains only the fat and oil derived from the raw material such as starch. In the present invention, "emulsification-free" means that the liquid is not under an emulsified state of the oil-in-water type in which fats and oil as oil drops are almost uniformly dispersed in the aqueous phase, or means that the liquid is not under an emulsified state of the water-in-oil type in which water as drops is almost uniformly dispersed in the aqueous phase.

In the present invention, the "seasoning liquid" is oil-free and contains one or more of the seasonings selected from the group of vinegar, saccharide, salt, high sweetness sweetener, organic acid, amino acid, nucleic acid, organic salt, soy source, dashi, honey, and the like. An example of the seasoning liquid may be seasoning vinegar which is seasoned by adding, for example, saccharide and salt into vinegar. From the point of versatility, it is preferable to use the seasoning liquid seasoned by adding, for example, saccharide and amino acid into salt solution.

The liquid cooked-rice improver of the third aspect of the present invention is preferably the seasoning liquid containing the powdered cooked-rice improver of the first aspect of the present invention or the seasoning liquid containing the mixture obtained by mixing the low-decomposition starch and the dextrin at the predetermined mixing ratio. That is, it is preferable for the liquid cooked-rice improver to contain, at an arbitrary concentration, one or more of the seasonings selected from the group of vinegar, saccharide, salt, high sweetness sweetener, organic acid, amino acid, nucleic acid, organic salt, soy source, dashi, honey, and the like. From the point of antiseptic performance or preservation properties, it is particularly preferable to contain 0.1 to 30 mass % of salt with respect to the whole liquid cooked-rice improver and to have the pH value of 2 to 7. It should be noted the liquid cooked-rice improver of the present invention may further contain other food additives in addition to the "low-decomposition starch" and the "dextrin" unless such other additives inhibits the effect of the present invention.

In the present invention, the "saccharide" may be sugar, high fructose corn syrup, glucose, starch syrup, reduced starch syrup, or the like. In the present invention, the "organic acid" may be citric acid, malic acid, gluconic acid, or acetic acid. In the present invention, the "amino acid" may be monosodium glutamate, glycine, or alanine. In the present invention, the "nucleic acid" may be sodium inosinate or sodium guanylate. In the present invention, the "dashi" may be kelp dashi, dried bonito dashi, or shiitake mushroom dashi. In the present invention, the "organic salt" may be sodium succinate or sodium citrate. In the present invention, the "high sweetness sweetener" may be sucralose, stevia, acesulfame potassium, saccharin, sodium saccharin, thaumatin, licorice extract, or neotame.

In the third aspect of the present invention, the contained ratio of the powdered cooked-rice improver with respect to the whole liquid cooked-rice improver should be determined appropriately by considering the solubility of the powdered cooked-rice improver, the adding amount of the liquid cooked-rice improver to the raw rice or to the cooked rice, and the like. However, the contained ratio is preferably determined from the range of between 0.01 and 30 mass % as the sum of the low-decomposition starch and the dextrin. It is not preferable to have the contained ratio of the powdered cooked-rice improver be less than the above range since the adding amount of the liquid cooked-rice improver becomes extremely large and thus the usability of the improver decreases. Additionally, it is not preferable to have the contained ratio of the powdered cooked-rice improver be greater than the above range since it becomes difficult to dissolve the powdered cooked-rice improver and/or the adding amount of the liquid cooked-rice improver becomes extremely small, and thus the usability of the improver decreases.

Similar to the powdered cooked-rice improver of the first aspect of the present invention, the liquid cooked-rice improver of the third aspect of the present invention also achieves flavor improving action on the cooked-rice. That is, the flavor of the rice produced with the liquid cooked-rice improver lasts and is sustained for 24 hours or more after the production or is even increased and enhanced at 24 hours after the production.

Similar to the powdered cooked-rice improver of the first aspect of the present invention, the liquid cooked-rice improver of the third aspect of the present invention also achieves aging-inhibiting action on the starch of the cooked rice. Accordingly, with the liquid cooked-rice improver, the soft texture of the cooked rice immediately after the production lasts and is sustained for 24 hours or more.

In the present invention, the liquid cooked-rice improver may be added into raw rice before cooking or to cooked rice after the cooking. A clear difference in the flavor improving action was not found between the cooked rice in which the improver was added before the cooking and the cooked rice in which the improver was added after the cooking. Note that the liquid cooked-rice improver may be added into the rice solely and independently, or may be added into the rice together with water, seasoning liquid, and the like.

The cooking process used in the present invention may be a conventional process and not limited to any specific process. As the pre-treatment of rice production, raw rice may be washed and immersed in water before the production. However, if the rice is so-called wash-free rice, it is not necessary to wash the rice. Further, the rice may be cooked with an immersion-free method. There should be no restriction on the varieties of rice to be cooked. For example, wash-free rice may be used.

In the present invention, the addition ratio of the liquid cooked-rice improver to the rice is set within a range of 0.001% to 1.0%, preferably 0.005% to 1.0%, more preferably 0.01% to 0.5% as dry mass of the sum of the low-decomposition starch and the dextrin with respect to the raw rice. It is not preferable to have the addition ratio of the liquid cooked-rice improver be less than the above range since the flavor of the cooked rice decreases after 24 hours from the production (i.e., flavor becomes deteriorated). It is also not preferable to have the addition ratio of the liquid cooked-rice improver be greater than the above range since the consumer may feel the texture and the flavor of the cooked-rice improver, as well as the cost-effectiveness becomes undesirable.

A fourth aspect of the present invention relates to a production method of the liquid cooked-rice improver according to the third aspect of the present invention. Particularly, the powdered cooked-rice improver of the first aspect of the present invention is added into water or seasoning liquid. Therefore, the terms "powdered cooked rice improver", "liquid cooked-rice improver", "low-decomposition starch", "dextrin", "flavor", "cooked rice", "vinegar", and "seasoning liquid" in the fourth aspect of the present invention are identical to the terms as described above.

Alternatively, the production method of the liquid cooked-rice improver according to the present invention may be a method to mix a liquid material containing only the low-decomposition starch and a liquid material containing only the dextrin so as to achieve the mixing ratio of the low-decomposition starch and the dextrin from 1:9 to 9:1 in the mass ratio. Alternatively, the method according to the present invention may be a method to add the powdered low-decomposition starch and the dextrin into water or seasoning liquid simultaneously or individually so as to achieve the above mixing ratio.

In the production method of the fourth aspect of the present invention, the proportion of the powdered cooked-rice improver should be determined appropriately by considering the solubility of the powdered cooked-rice improver, the adding amount of the liquid cooked-rice improver to the raw rice or to the cooked rice, and the like. However, the portion of the powdered cooked-rice improver is preferably determined from the range of between 0.01 and 30 mass % with respect to the whole liquid cooked-rice improver as the sum of the low-decomposition starch and the dextrin. It is not preferable to have the mixing ratio of the powdered cooked-rice improver be less than the above range since the adding amount of the liquid cooked-rice improver becomes extremely large and thus the usability of the improver decreases. Additionally, it is not preferable to have the mixing ratio of the powdered cooked-rice improver be greater than the above range since it becomes difficult to dissolve the powdered cooked-rice improver and/or the adding amount of the liquid cooked-rice improver becomes extremely small, and thus the usability of the improver decreases.

It should be noted that the process of adding the powdered cooked-rice improver (or low-decomposition starch and dextrin) into water or seasoning liquid is not limited to the above-described process. The low-decomposition starch and the dextrin included in the powdered cooked-rice improver of the present invention have water solubility. Therefore, the powdered cooked-rice improver is dissolved in the water or the seasoning liquid by mixing the improver therein through a conventional process as long as the water or the seasoning liquid is at the room temperature or higher. When the room temperature is so low that it is difficult to dissolve the improver, the water or the seasoning liquid may be heated appropriately unless the component of the powdered cooked-rice improver and/or the seasoning liquid do not change. It should be noted the liquid cooked-rice improver of the present invention may additionally contain other food additives unless such other additives inhibits the effect of the present invention.

The liquid cooked-rice improver of the fourth aspect of the present invention is preferably the seasoning liquid containing the powdered cooked-rice improver of the first aspect of the present invention or the seasoning liquid containing the mixture obtained by mixing the low-decomposition starch and the dextrin at the predetermined mixing ratio. That is, it is preferable for the liquid cooked-rice improver to contain, at an arbitrary concentration, one or more of the seasonings selected from the group of vinegar, saccharide, salt, high sweetness sweetener, organic acid, amino acid, nucleic acid, organic salt, soy source, dashi, honey, and the like, so as to achieve a desired quality of the cooked rice. From the point of antiseptic performance or preservation properties, it is preferable to contain 0.1 to 30.0 mass % of salt and to have the pH value of 2 to 7.

Accordingly, the liquid cooked-rice improver produced by the production method of the fourth aspect of the present invention has the flavor lasting or sustaining action and/or the flavor enhancing action, and the aging-inhibiting action on the starch.

A fifth aspect of the present invention relates to a production method of flavor-improved cooked rice. Particularly, the powdered cooked-rice improver of the first aspect of the present invention or the liquid cooked-rice improver of the third aspect of the present invention is added to the rice such that the adding amount thereof is within a range of 0.001% to 1.0% as dry mass of the sum of the low-decomposition starch and the dextrin with respect to raw rice. Alternatively, the method of producing the cooked rice in the present invention may be a method of adding a powdered material or a liquid material containing the low-decomposition starch and a powdered material or a liquid material containing the dextrin into the rice simultaneously or individually such that the total adding amount thereof falls within the above range during a different phase of the production (e.g., before and after the cooking). Consequently, the low-decomposition starch and the dextrin are contained in the cooked rice with the mass ratio of 1:9 to 9:1.

In the fifth aspect of the present invention, the powdered cooked-rice improver and the liquid cooked-rice improver are collectively referred to as a "cooked-rice improver". The terms "powdered cooked rice improver", "liquid cooked-rice improver", "low-decomposition starch", "dextrin", "flavor", "rice", "vinegar", and "seasoning liquid" have the same meaning as described above.

In the production method of the fifth aspect of the present invention, the powdered cooked-rice improver of the present invention is added into the rice in an amount of 0.001% to 1.0% as dry mass of the sum of the low-decomposition starch and the dextrin with respect to raw rice. As a result, it is possible to obtain the flavor-improved cooked rice.

In the fifth aspect of the present invention, the "flavor improved" means that the sustainability of the flavor is improved and/or the flavor is enhanced. In the fifth aspect of the present invention, the "sustainability of the flavor is improved" means that the flavor of the rice produced with the cooked-rice improver lasts and is sustained for 24 hours or more (to be specific, for 24 hours) and even for 48 hours or more (to be specific, for 48 hours) after the production in comparison with that of the rice produced without the cooked-rice improver. In this specification, "the flavor is enhanced" means that the flavor of the rice produced with the cooked-rice improver is enhanced or strengthened at a time after 24 hours or more (to be specific, for 24 hours) and even at a time after 48 hours or more (to be specific, 48 hours) from the production in comparison with that of the rice produced without the cooked-rice improver.

In the fifth aspect of the present invention, the cooked-rice improver of the present invention is added to the rice with the predetermined ratio. As a result, it is possible to produce the cooked rice having an aging-inhibiting action on the starch. In the fifth aspect of the present invention, "having an aging-inhibiting action" means the soft texture of the just-cooked rice lasts and is sustained for 24 hours or more (to be specific, for 24 hours) and even for 48 hours or more (to be specific, for 48 hours) after the production with the coked-rice improver. As a result, the looseness and form-retention ability (formability) of the cooked rice are sustained.

In the fifth aspect of the present invention, the proportion of the cooked-rice improver added to the rice is set within a range of 0.001% to 1.0%, preferably 0.005% to 1.0%, more preferably 0.01% to 0.5% as dry mass of the sum of the low-decomposition starch and the dextrin with respect to raw rice. It is not preferable to have the addition ratio of the cooked-rice improver be less than the above range since the flavor of the cooked rice decreases after 24 hours from the production (i.e., flavor becomes deteriorated). It is also not preferable to have the addition ratio of the cooked-rice improver be greater than the above range since the consumer may feel the texture and the flavor of the cooked-rice improver contained in the liquid, as well as the cost-effectiveness becomes undesirable.

Apart from the process of adding cooked-rice improver of the present invention into the rice within a range of 0.001% to 1.0% as dry mass of the sum of the low-decomposition starch and the dextrin with respect to the raw rice, the fifth aspect of the present invention does not have any limitation on the production method. That is, the conventional method may be applied thereto.

In the fifth aspect of the present invention, the cooked-rice improver may be added into raw rice before the cooking or to cooked rice after the cooking. A clear difference in the flavor improving action was not found between the cooked rice in which the improver was added before the cooking and the cooked rice in which the improver was added after the cooking. The liquid cooked-rice improver may be added into the rice solely and independently, or may be added into the rice together with water, seasoning liquid, and the like.

When the cooked-rice improver is added to the rice after the cooking, rice such as nonglutinous rice is first washed, immersed, and cooked, and the cooked-rice improver of the present invention is added to the cooked rice so as to be contained therein.

Specifically, in order to produce sushi rice, the cooked rice is steamed, mixed with vinegar, loosened, and cooled sequentially in the common process. Thus, when the cooked rice is mixed with vinegar, the cooked-rice improver may be added to the rice within the predetermined ratio of 0.001% to 1.0% as dry mass of the sum of the low-decomposition starch and the dextrin with respect to the raw rice. In this case, the cooked-rice improver may be added to the cooked rice as the liquid cooked-rice improver containing the (dissolved) powdered cooked-rice improver and seasoning vinegar or may be added to the cooked rice separately from the seasoning vinegar.

When the cooked-rice improver is added to the rice before the cooking, the cooked-rice improver (as well as seasoning) is added to the rice after the rice is washed and immersed. The rice is then cooked such that the cooked-rice improver is contained therein.

The cooking process used in the present invention may be a conventional process and not limited to any specific process. As the pre-treatment of rice production, raw rice may be washed and immersed in water before the production. However, if the raw rice is so-called wash-free rice, it is not necessary to wash the rice. Further, the rice may be cooked with an immersion-free method. There should be no restriction on the varieties of rice to be cooked. For example, wash-free rice may be used.

It should be noted that in the fifth aspect of the present invention, it is preferable to increase the amount of water added during the cooking process more than the conventional amount regardless of the timing of adding the cooked-rice improver. When the amount of water added during the cooking process is increased to provide a lot of moisture to the rice, the rice grain becomes too soft and the texture of the cooked rice becomes unfavorable, disadvantageously. However, by adding the cooked-rice improver of the present invention into the rice, the viscosity on the surface of the cooked rice is suppressed. Therefore, it is possible to prevent the cooked rice from being too soft and to further achieve the aging-inhibiting effect.

When cooking white rice, the water amount added to the raw rice is 1.3 or more to less than 1.5 pts. mass per one pt. mass of the raw rice. On the other hand, when cooking highly hydrated cooked rice in the fifth aspect of the present invention, the water amount added to the raw rice is preferably 1.5 or more to 1.8 pts. mass or less per one pt. mass of the raw rice. For sushi rice, the water amount added to the raw rice is generally 1.2 pts. mass or more to less than 1.3 pts. mass per one pt. mass of the raw rice. However, when cooking highly hydrated cooking rice for sushi rice, the water amount added to the raw rice is preferably 1.3 pts. mass or more to 1.7 pts. mass or less per one pt. mass of the raw rice.

A sixth aspect of the present invention provides cooked rice produced by the production method of the fifth aspect of the present invention such that the flavor of the cooked rice is improved. The cooked rice of the present invention may include, in addition to the cooked rice produced with the cooked-rice improver of the present invention, the cooked rice produced by adding a powdered material or a liquid material containing the low-decomposition starch and a powdered material or a liquid material containing the dextrin into the rice simultaneously or individually such that the total adding amount thereof falls within the above range during the production process. Consequently, the low-decomposition starch and the dextrin are contained in the cooked rice with the mass ratio of 1:9 to 9:1.

Accordingly, the cooked rice of the sixth aspect of the present invention contains the powdered cooked-rice improver or the liquid cooked-rice improver in an amount of 0.001% to 1.0%, preferably 0.005% to 1.0%, more preferably 0.01% to 0.5% as dry mass of the sum of the low-decomposition starch and the dextrin with respect to the raw rice. It is not preferable to have the amount of the cooked-rice improver contained in the rice be less than the above range since the flavor of the cooked rice decreases after 24 hours from the production (i.e., flavor becomes deteriorated). It is also not preferable to have the amount of the cooked-rice improver contained in the rice be greater than the above range since the consumer may feel the texture and the flavor of the cooked-rice improver as well as the cost-effectiveness is not desirable.

In the sixth aspect of the present invention, the powdered cooked-rice improver and the liquid cooked-rice improver are collectively referred to as a "cooked-rice improver". The terms "powdered cooked rice improver", "liquid cooked-rice improver", "low-decomposition starch", "dextrin", "flavor", "rice", "vinegar", and "seasoning liquid" have the same meaning as described above.

The cooked rice of the sixth aspect of the present invention contains the cooked-rice improver in an amount of 0.001% to 1.0% as dry mass of the sum of the low-decomposition starch and the dextrin with respect to the raw rice. Accordingly, the flavor of the cooked rice is improved. That is, the flavor of the cooked rice of the sixth aspect of the present invention produced by the production method of the fifth aspect of the present invention lasts and is sustained for 24 hours or more, and/or the flavor of the cooked rice is enhanced.

In the sixth aspect of the present invention, the cooked-rice improver of the present invention is contained in the rice at the predetermined ratio. Therefore, the cooked rice has an aging-inhibiting action on the starch. Specifically, in the sixth aspect of the present invention, the soft texture of the just-cooked rice lasts and is sustained for 24 hours or more after the production of the cooked rice with the production method of the fifth aspect of the present invention. Further, the looseness and the form-retention ability (formability) of the cooked rice are also sustained.

As described above, with the cooked rice of the sixth aspect of the present invention, the amount of water added during the cooking process may be increased to provide a lot of moisture to the rice. Accordingly it is possible to achieve the aging-inhibiting effect while preventing the cooked rice from being too soft.

A seventh aspect of the present invention relates to a method of improving a sustainability of the flavor of cooked rice. Specifically, the powdered cooked-rice improver of the first aspect of the present invention or the liquid cooked-rice improver of the third aspect of the present invention is added to the rice in an amount of 0.001% to 1.0% as dry mass of the sum of the low-decomposition starch and the dextrin with respect to the raw rice. The flavor improving method of the present invention may include, in addition to the method described above, a method of adding a powdered material or a liquid material containing the low-decomposition starch and a powdered material or a liquid material containing the dextrin into the rice simultaneously or individually such that the total adding amount thereof falls within the above range during the production process. Consequently, the low-decomposition starch and the dextrin are contained in the cooked rice with the mass ratio of 1:9 to 9:1.

Similar to the production method of the fifth aspect of the present invention, the powdered cooked-rice improver or the liquid cooked-rice improver of the present invention is added to the rice in an amount of 0.001% to 1.0%, preferably 0.005% to 1.0%, more preferably 0.01% to 0.5% as dry mass of the sum of the low-decomposition starch and the dextrin with respect to the raw rice. With this, as described in the fifth aspect of the present invention, it is possible to improve the flavor of the cooked rice (i.e., flavor sustaining action and/or flavor enhancement action), as well as to achieve the aging-inhibiting action on the starch.

EMBODIMENTS

Hereinafter, the present invention will be described with reference to the embodiments. However, the scope of the present invention is not limited to these embodiments.

Evaluation Test 1 (Verifying Range of Mass Ratio of Low-Decomposition Starch and Dextrin)

An Evaluation Test 1 was carried out to verify the range of the mass ratio of the low-decomposition starch and the dextrin that improves the flavor of the cooked rice as the cooked-rice improver. In the Test, a low-decomposition starch having an average molecular weight of 2.5 million was used as the subject low-decomposition starch and a dextrin having the DE value of 3.5 are selected as the subject dextrin. The powdered mixtures (i.e., powdered cooked-rice improvers) of the low-decomposition starch and the dextrin were prepared by changing the mass ratios in accordance with the Table 1.

The low-decomposition starch and the dextrin were obtained by the following steps. First, waxy cornstarch (which is contained in one liter of water in an amount of 200 g), and glucoamylase ("Sumizyme" manufactured by Shin Nihon Chemical Co., Ltd.) and/or α-amylase ("Sumizyme-L" manufactured by Shin Nihon Chemical Co., Ltd.) (each of which is contained in one liter of the waxy cornstarch solution in an amount of 10 g) were charged into water and were enzymatically decomposed at a temperature of 60 deg C. during agitation. After each decomposed liquid was prepared (i.e., the time period required for the starch to reach a desired average molecular weight was estimated and the decomposed liquid was prepared accordingly), the enzyme thereof was deactivated by heating the decomposed liquid for 20 minutes at a temperature of 90 deg C. The resultant enzymatically decomposed substances were dried by hot air and then pulverized by a pulverizer. The molecular weights of the enzymatically decomposed substances were measured by the method described in the paragraph 0011. The analyzed results show that the enzymatically decomposed substances have one maximum part. For the following evaluation tests, the low-decomposition starch and dextrin having a narrow molecular weight distribution were selected. The DE value was measured by the method described in the paragraph 0012.

The powdered cooked-rice improver was added into the raw rice, which had been washed and immersed. The adding amount of the improver was 0.5% of the raw rice before being washed and immersed (i.e., the amount was determined as dry mass). The amount of added water was 1.25 pts. mass (i.e., standard amount) per one pt. mass of the raw rice, and the rice was cooked with a commercially available rice cooker in a conventional manner. The cooked white rice was then put into an airtight container and stored therein for 24 hours at a temperature of 10 deg C. The stored white rice was then heated by a microwave up to the temperature substantially equal to that of the just-cooked white rice before the evaluation of the flavor and the sustainability on physical properties of the cooked rice. It should be noted that the evaluation of the physical properties may have no meaning if such properties have no use with respect to the improvement effects on the flavor. Therefore, the evaluation of the physical properties was made so as to be used as auxiliary judgement indexes. Additionally, "sushi rice" was prepared by adding the seasoning vinegar (which includes vinegar, water, sugar, and salt) into the cooked-rice immediately after the cooking. The sushi rice was then left until the temperature thereof becomes at the normal temperature, and treated in a similar manner to the above-mentioned "cooked white rice". The evaluation was then carried out after 24 hours.

In the Evaluation Test 1, the flavor sustainability of each sample was determined by six experts in accordance with the following criteria (using seven grades) and was averaged. The results are shown in Table 1.

1: Significantly deteriorated in comparison with the just-cooked rice
2: Deteriorated in comparison with the just-cooked rice
3: Slightly deteriorated in comparison with the just-cooked rice
4: Similar to the just-cooked rice
5: Slightly enhanced in comparison with the just-cooked rice
6: Enhanced in comparison with the just-cooked rice
7: Significantly enhanced in comparison with the just-cooked rice The "overall assessment" for the flavor sustainability, the properties of "white rice" and "sushi rice", and the "overall assessment including flavor/properties sustaining effects" were determined by six experts in accordance with the following criteria and were averaged. The results are shown in Table 1.

x: Not favorable
Δ: Slightly unfavorable
○: Preferable
◉: Particularly preferable

TABLE 1

| POWDERED COOKED-RICE IMPROVER | | MASS RATIO OF LOW-DECOMPOSITION STARCH (MOLECULAR WEIGHT = 2,500,000) AND DEXTRIN (DE VALUE = 3.5) | | | | |
|---|---|---|---|---|---|---|
| LOW-DECOMPOSITION STARCH (MOLECULAR WEIGHT = 2,500,000) | | 0 | 1 | 2 | 4 | 6 |
| DEXTRIN (DE VALUE = 3.5) | | 10 | 9 | 8 | 6 | 5 |
| FLAVOR AND PROPERTIES OF "WHITE RICE" | SMELL | 4 | 4 | 5 | 5 | 5 |
| | SWEETNESS | 4 | 4 | 5 | 5 | 5 |
| | UMAMI | 3 | 4 | 5 | 5 | 5 |
| | OVERALL | 4 | 4 | 5 | 5 | 5 |
| OVERALL ASSESSMENT | | Δ | ○ | ◉ | ◉ | ◉ |
| FLAVOR AND PROPERTIES OF "SUSHI RICE" | SOURNESS | 5 | 5 | 5 | 5 | 5 |
| | SMELL | 4 | 4 | 5 | 5 | 5 |
| | SWEETNESS | 5 | 5 | 5 | 5 | 5 |
| | UMAMI | 5 | 5 | 5 | 5 | 5 |
| | SALTINESS | 4 | 5 | 5 | 5 | 5 |
| OVERALL ASSESSMENT | | ○ | ○ | ◉ | ◉ | ◉ |
| PHYSICAL PROPERTY OF "WHITE RICE" AND "SUSHI RICE" | LOOSENESS/FORMABILITY | X | ○ | ◉ | ◉ | ◉ |
| OVERALL ASSESSMENT INCLUDING FLAVOR/PROPERTIES SUSTAINING EFFECTS | | X | ○ | ◉ | ◉ | ◉ |
| NOTE (FLAVOR AND PROPERTIES AFTER 24 HOURS OF STORAGE AND PROPERTY AFTER STORAGE OF 24 HOURS) | | SLIGHTLY DETERIORATED IN FLAVOR AND POOR LOOSENESS | SIMILAR TO JUST-COOKED RICE | SLIGHTLY ENHANCED IN FLAVOR AND EXCELLENT LOOSENESS IN COMPARISON WITH JUST-COOKED RICE | SLIGHTLY ENHANCED IN FLAVOR AND EXCELLENT LOOSENESS IN COMPARISON WITH JUST-COOKED RICE | SLIGHTLY ENHANCED IN FLAVOR AND EXCELLENT LOOSENESS IN COMPARISON WITH JUST-COOKED RICE |

| POWDERED COOKED-RICE IMPROVER | | MASS RATIO OF LOW-DECOMPOSITION STARCH (MOLECULAR WEIGHT = 2,500,000) AND DEXTRIN (DE VALUE = 3.5) | | | |
|---|---|---|---|---|---|
| LOW-DECOMPOSITION STARCH (MOLECULAR WEIGHT = 2,500,000) | | 6 | 8 | 9 | 10 |
| DEXTRIN (DE VALUE = 3.5) | | 4 | 2 | 1 | 0 |
| FLAVOR AND PROPERTIES OF "WHITE RICE" | SMELL | 5 | 4 | 4 | 4 |
| | SWEETNESS | 5 | 5 | 5 | 5 |
| | UMAMI | 5 | 5 | 5 | 5 |
| | OVERALL | 5 | 4 | 4 | 4 |
| OVERALL ASSESSMENT | | ◉ | ○ | ○ | ○ |

TABLE 1-continued

| | | | | | |
|---|---|---|---|---|---|
| FLAVOR AND PROPERTIES OF "SUSHI RICE" | SOURNESS | 5 | 5 | 5 | 5 |
| | SMELL | 5 | 4 | 4 | 4 |
| | SWEETNESS | 5 | 4 | 4 | 4 |
| | UMAMI | 5 | 5 | 5 | 5 |
| | SALTINESS | 5 | 4 | 4 | 4 |
| OVERALL ASSESSMENT | | ◎ | ○ | ○ | ○ |
| PHYSICAL PROPERTY OF "WHITE RICE" AND "SUSHI RICE" | LOOSENESS/ FORMABILITY | ◎ | ○ | ○ | Δ |
| OVERALL ASSESSMENT INCLUDING FLAVOR/PROPERTIES SUSTAINING EFFECTS | | ◎ | ○ | ○ | Δ |
| NOTE (FLAVOR AND PROPERTIES AFTER 24 HOURS OF STORAGE AND PROPERTY AFTER STORAGE OF 24 HOURS) | | SLIGHTLY ENHANCED IN FLAVOR AND EXCELLENT LOOSENESS IN COMPARISON WITH JUST-COOKED RICE | SIMILAR TO JUST-COOKED RICE | SIMILAR TO JUST-COOKED RICE | FLAVOR SUSTAINED BUT SLIGHTLY DETERIORATED IN LOOSENESS |

As shown in Table 1, the flavor sustaining effect and/or the enhancement effect of the cooked rice and the sustaining effect of the physical properties were achieved by adding the cooked-rice improver of the present invention. Further, a similar sustaining effect and/or a similar enhancement effect of the flavor and a similar sustaining effect of the physical properties were achieved for the cooked white rice and sushi rice. As shown in Table 1, the sustaining effects of the flavor and physical properties of the cooked white rice and sushi rice are achieved when the mass ratio of the low-decomposition starch (molecular weight of 2.5 million) and the dextrin (DE value of 3.5) is within the range from 1:9 to 9:1, preferably 2:8 to 6:4, as the ratio of the low-decomposition starch:dextrin.

Evaluation Test 2 (Verifying Range of Average Molecular Weight and DE Value of Low-Decomposition Starch and Dextrin)

An Evaluation Test 2 was carried out to verify the range of the average molecular weights and of the DE values that achieves the effect of the cooked-rice improver. In view of the results shown in Table 1, each of the low-decomposition starch and each of the dextrin were mixed at the mass ratio of 2:8 and were verified in a similar manner to the Evaluation Test 1. The low-decomposition starch and the dextrin having the listed average molecular weights and DE values were prepared in a similar manner to the method used in the Evaluation Test 1.

Since the Evaluation Test 1 showed that the flavor sustaining effects of the "white rice" and the "sushi rice" were similar to each other, the following test was carried out on the "sushi rice" only. Further, since the Evaluation Test 1 showed the cooked-rice improver has the flavor sustaining effect and the flavor enhancement effect, the evaluations of the items related to the "texture" of the cooked rice were additionally determined by the six experts with seven grades and were averaged so as to have more detailed evaluation results as "overall assessment including the sustaining effects of the flavor and physical properties". The amount of water added to the rice was increased to 1.55 pts. mass (i.e., excess amount of water) per one pt. mass of the raw rice so as to achieve the aging-inhibiting effect. The other cooking conditions and the evaluation methods were identical to that of the Evaluation Test 1. The results are shown in Table 2.

"Looseness": Adhesive strength between rice grains

1: Significantly difficult to loosen in comparison with the just-cooked rice

2: Difficult to loosen in comparison with the just-cooked rice

3: Slightly difficult to loosen in comparison with the just-cooked rice

4: Similar to the just-cooked rice

5: Slightly easy to loosen in comparison with the just-cooked rice

6: Easy to loosen in comparison with the just-cooked rice

7: Significantly easy to loosen in comparison with the just-cooked rice

"Hardness": Hardness of the rice grains when chewing the rice

1: Significantly hard in comparison with the just-cooked rice

2: Hard in comparison with the just-cooked rice

3: Slightly hard in comparison with the just-cooked rice

4: Similar to the just-cooked rice

5: Slightly soft in comparison with the just-cooked rice

6: Soft in comparison with the just-cooked rice

7: Significantly soft in comparison with the just-cooked rice

"Stickiness": Stickiness of the rice grains attached to the teeth which is felt when opening the mouth after chewing the rice 1: Significantly deteriorated in comparison with the just-cooked rice 2: Deteriorated in comparison with the just-cooked rice 3: Slightly deteriorated in comparison with the just-cooked rice 4: Similar to the just-cooked rice 5: Slightly enhanced in comparison with the just-cooked rice 6: Enhanced in comparison with the just-cooked rice 7: Significantly enhanced in comparison with the just-cooked rice

TABLE 2

| POWDERED COOKED-RICE IMPROVER | | KINDS OF LOW-DECOMPOSITION STARCH AND DEXTRIN (MASS RATIO = 2:8) | | | | | | |
|---|---|---|---|---|---|---|---|---|
| AVERAGE MOLECULAR WEIGHT OF LOW-DECOMPOSITION STARCH | | 2,500,000 | 2,500,000 | 2,500,000 | 2,500,000 | 2,500,000 | 500,000 | 800,000 |
| DE VALUE OF DEXTRIN | | 50 | 28 | 11.5 | 3.5 | 1.0 | 3.5 | 3.5 |
| FLAVOR AND PROPERTIES OF "SUSHI RICE" | SOURNESS | 4 | 5 | 6 | 6 | 6 | 5 | 6 |
| | SMELL | 4 | 4 | 5 | 5 | 5 | 4 | 5 |
| | SWEETNESS | 4 | 4 | 5 | 6 | 6 | 5 | 6 |
| | UMAMI | 4 | 4 | 5 | 6 | 6 | 5 | 6 |
| | SALTINESS | 4 | 4 | 5 | 5 | 5 | 5 | 5 |
| OVERALL ASSESSMENT | | ○ | ○ | ◎ | ◎ | ◎ | ○ | ◎ |
| FOOD TEXTURE AND PROPERTIES OF "SUSHI RICE" | LOOSENESS | 4 | 5 | 6 | 6 | 6 | 6 | 6 |
| | HARDNESS | 4 | 5 | 6 | 6 | 6 | 5 | 5 |
| | STICKINESS | 4 | 4 | 4 | 4 | 4 | 5 | 5 |
| OVERALL ASSESSMENT | | ○ | ○ | ○ | ◎ | ◎ | ◎ | ◎ |
| OVERALL ASSESSMENT INCLUDING FLAVOR/PROPERTIES SUSTAINING EFFECTS | | ○ | ○ | ◎ | ◎ | ◎ | ◎ | ◎ |

| POWDERED COOKED-RICE IMPROVER | | KINDS OF LOW-DECOMPOSITION STARCH AND DEXTRIN (MASS RATIO = 2:8) | | | | | |
|---|---|---|---|---|---|---|---|
| AVERAGE MOLECULAR WEIGHT OF LOW-DECOMPOSITION STARCH | | 1,800,000 | 2,500,000 | 3,500,000 | 4,000,000 | 4,500,000 | 5,000,000 |
| DE VALUE OF DEXTRIN | | 3.5 | 3.5 | 3.5 | 3.5 | 3.5 | 3.5 |
| FLAVOR AND PROPERTIES OF "SUSHI RICE" | SOURNESS | 6 | 6 | 6 | 5 | 5 | 5 |
| | SMELL | 5 | 5 | 5 | 5 | 4 | 4 |
| | SWEETNESS | 6 | 6 | 5 | 4 | 4 | 4 |
| | UMAMI | 6 | 6 | 5 | 5 | 5 | 5 |
| | SALTINESS | 5 | 5 | 5 | 4 | 4 | 4 |
| OVERALL ASSESSMENT | | ◎ | ◎ | ◎ | ◎ | ○ | ○ |
| FOOD TEXTURE AND PROPERTIES OF "SUSHI RICE" | LOOSENESS | 6 | 6 | 6 | 6 | 6 | 5 |
| | HARDNESS | 6 | 6 | 6 | 6 | 5 | 5 |
| | STICKINESS | 5 | 4 | 4 | 4 | 4 | 4 |
| OVERALL ASSESSMENT | | ◎ | ◎ | ◎ | ◎ | ◎ | ○ |
| OVERALL ASSESSMENT INCLUDING FLAVOR/PROPERTIES SUSTAINING EFFECTS | | ◎ | ◎ | ◎ | ○ | ○ | ○ |

As shown in Table 2, the sustaining effect of the quality (flavor and physical properties) of the cooked rice is achieved when the average molecular weights of the low-decomposition starch are within the range from 0.5 million to 5.0 million, preferably 0.5 million to 4.5 million, more preferably 0.5 million to 4.0 million, particularly preferably 0.8 million to 3.5 million. Further, it is achieved if the DE values of the dextrin were greater than 1 and equal to or less than 50, preferably greater than 1 and equal to or less than 15. Further, based on the comparison between the mixture of the low-decomposition starch (molecular weight of 2.5 million) and the dextrin (DE value of 3.5) mixed at the mass ratio of 2:8 in the Evaluation Test 1 and the mixture of the same in the Evaluation Test 2, it was confirmed that the flavor and the properties of the "sushi rice" were increased when cooked with the excess amount of water in the Evaluation Test 2. That is, the items of "sourness", "sweetness", and "umami" were one point higher than that in the Evaluation Test 1 (the items of "smell" and "saltiness" have the same score as that in the Evaluation Test 2). When cooked with the excess amount of water, in addition to the flavor sustaining effect, the enhancement effect was also recognized. It should be noted that the flavor enhancement effect, the items of which have 6 points or more, was also achieved with different combinations of other low-decomposition starch and other dextrin. Accordingly, it should be recognized that the effect is a universal effect in the present invention.

Evaluation Test 3 (Verifying Range of Total Adding Amount (Dry Mass %) of Low-Decomposition Starch and Dextrin with Respect to Raw Rice)

An Evaluation Test 3 was carried out to verify the range of the adding ratios of the powdered and liquid cooked-rice improvers to the raw rice. In view of the result shown in Table 1, the low-decomposition starch (molecular weight of 2.5 million) and the dextrin (DE value of 3.5) were mixed at the mass ratio of 2:8 to obtain the powdered cooked-rice improver. Then, the obtained powdered cooked-rice improver was added to the seasoning liquid (containing water, 10 mass % of sucrose, 11 mass % of salt, and vinegar, and adjusted to pH 3.2) in an amount of 2 mass % to obtain the liquid cooked-rice improver. The obtained liquid cooked-rice improver was then added to the rice such that the total addition (i.e., dry mass %) of the low-decomposition starch and dextrin with respect to the raw rice was adjusted to be complied with that of Table 3. The amount of water added thereto with respect to the 1 pt. mass of the raw rice was set to 1.4 pts mass (i.e., large amount of water), and the rice was cooked. The cooked rice was then mixed with the seasoning vinegar, and thereby the "sushi rice" was obtained. The other cooking conditions and the evaluation methods were identical to that of the Evaluation Test 1 and the Evaluation Test 2. The results are shown in Table 3.

TABLE 3

| LIQUID COOKED-RICE IMPROVER (LYSATE IN LIQUID SEASONING) | TOTAL MASS ADDITION (%) OF LOW-DECOMPOSITION STARCH (MOLECULAR WEIGHT = 2,500,000) AND DEXTRIN (DE VALUE = 3.5) FOR RAW RICE | | | | | | |
|---|---|---|---|---|---|---|---|
| TOTAL ADDITION Of LOW-DECOMPOSITION STARCH AMD DEXTRIN TO RAW RICE | 0.0005% | 0.001% | 0.005% | 0.01% | 0.05% | 0.5% | 1% |

TABLE 3-continued

| | | | | | | | | |
|---|---|---|---|---|---|---|---|---|
| FLAVOR AND PROPERTIES OF "SUSHI RICE" | SOURNESS | 3 | 4 | 5 | 5 | 5 | 6 | 6 |
| | SMELL | 3 | 4 | 4 | 4 | 4 | 5 | 4 |
| | SWEETNESS | 3 | 4 | 5 | 5 | 5 | 5 | 5 |
| | UMAMI | 3 | 4 | 4 | 5 | 6 | 6 | 6 |
| | SALTINESS | 3 | 4 | 4 | 5 | 5 | 5 | 5 |
| OVERALL ASSESSMENT | | X | ○ | ○ | ○ | ◎ | ◎ | ◎ |
| FOOD TEXTURE AND PROPERTIES OF "SUSHI RICE" | LOOSENESS | 3 | 4 | 4 | 4 | 5 | 5 | 5 |
| | HARDNESS | 3 | 4 | 4 | 4 | 5 | 5 | 5 |
| | STICKINESS | 3 | 4 | 4 | 4 | 4 | 4 | 4 |
| OVERALL ASSESSMENT | | X | ○ | ○ | ○ | ◎ | ◎ | ◎ |
| OVERALL ASSESSMENT INCLUDING FLAVOR/PROPERTIES SUSTAINING EFFECTS | | X | ○ | ○ | ○ | ◎ | ◎ | ◎ |
| COST EFFECTIVENESS | | NOT GOOD | SLIGHTLY GOOD | EXCELLENT | PARTICULARLY GOOD | GOOD | SLIGHTLY GOOD | NOT GOOD |

As shown in Table 3, it is preferable to add the powdered cooked-rice improver or the liquid cooked-rice improver of the present invention to the rice at the ratio from 0.001% to 1.0%, preferably 0.005% to 1.0%, more preferably 0.01% to 0.5% as dry mass of the sum of the low-decomposition starch and the dextrin with respect to the raw rice. Although not described herein, similar results were obtained when water was added to the liquid cooked-rice improver instead of the seasoning liquid.

Evaluation Test 4 (Test to Verify Effects of Addition of Improver Before Cooking and Addition Thereof after Cooking)

An Evaluation Test 4 was carried out to verify as to whether the quality sustaining effect of the cooked rice was achieved by the cooked-rice improver under the following conditions: (1) addition of the improver after cooking, (2) increasing the amount of water added thereto during cooking process, and (3) extending the time period to store the cooked rice. The preparation of the liquid cooked-rice improver was carried out in the same manner as that of the Evaluation Test 3. To be specific, in view of the result shown in Table 1, the low-decomposition starch (molecular weight of 2.5 million) and the dextrin (DE value of 3.5) were mixed at the mass ratio of 2:8 to obtain the powdered cooked-rice improver. The obtained powdered cooked-rice improver was then added to the seasoning liquid in an amount of 2 mass % to obtain the liquid cooked-rice improver.

In the "addition (of the improver) before cooking" (in test sections 1 and 3), the liquid cooked-rice improver was added to the raw rice in an amount shown in the Table 4 after washing and immersing the raw rice, and the water was added thereto such that the amounts of the water per one pt. mass of the raw rice complied with the values shown in the Table 4. The rice was then cooked with a commercially available rice cooker in a conventional manner, and the seasoning vinegar was added to the cooked white rice to obtain "sushi rice". In the "addition (of the improver) after cooking" (in test sections 2 and 4), the water was added to the raw rice such that the amounts of the water per one pt. mass of the raw rice complied with the values shown in the Table 4. The rice was then cooked with the commercially available rice cooker in the conventional manner. The liquid cooked-rice improver (in form of seasoning liquid) was then added to the cooked white rice in an amount shown in the Table 4 so as to obtain the "sushi rice". It should be noted that the liquid cooked-rice improver used under the condition of "addition (of the improver) after cooking" was obtained by mixing the seasoning liquid used under the condition of "addition (of the improver) before cooking" with the liquid cooked-rice improver shown in the Table 4.

Apart from the above, the cooking processes of the "white rice" and that of the "sushi rice" were identical to that of the Evaluation Test 3. The "white rice" and the "sushi rice" produced as described above were stored under the same conditions as that of the Evaluation Test 3 for 24 hours, 48 hours, and 72 hours, and then evaluated in a similar manner to the Evaluation Test 3. The results are shown in the Table 4.

TABLE 4

COMPARISON IN ADDITION OF IMPROVER BEFORE/AFTER COOKING AND EXCESS AMOUNT OF WATER

| LIQUID COOKED-RICE IMPROVER (LYSATE IN LIQUID SEASONING) TEST SECTION | TEST SECTION 1 ADDITION BEFORE COOKING (NORMAL AMOUNT OF WATER) | TEST SECTION 2 ADDITION AFTER COOKING (NORMAL AMOUNT OF WATER) | TEST SECTION 3 ADDITION BEFORE COOKING (EXCESS AMOUNT OF WATER) | TEST SECTION 4 ADDITION AFTER COOKING (EXCESS AMOUNT OF WATER) |
|---|---|---|---|---|
| ADDITION BEFORE COOKING (TO RAW RICE) | 0.1% | — | 0.1% | — |
| ADDITION AFTER COOKING (TO RAW RICE) | — | 0.1% | — | 0.1% |
| ADDITION OF WATER DURING COOKING PROCESS (PER ONE PART MASS OF RAW RICE) | 1.25 PTS. MASS | 1.25 PTS. MASS | 1.55 PTS. MASS | 1.55 PTS. MASS |
| OVERALL ASSESSMENT INCLUDING FLAVOR AND PROPERTIES OF "WHITE RICE" (AFTER 24 HOURS) | ◎ | ◎ | ◎ | ◎ |

TABLE 4-continued

| | COMPARISON IN ADDITION OF IMPROVER BEFORE/AFTER COOKING AND EXCESS AMOUNT OF WATER | | | |
|---|---|---|---|---|
| LIQUID COOKED-RICE IMPROVER (LYSATE IN LIQUID SEASONING) TEST SECTION | TEST SECTION 1 ADDITION BEFORE COOKING (NORMAL AMOUNT OF WATER) | TEST SECTION 2 ADDITION AFTER COOKING (NORMAL AMOUNT OF WATER) | TEST SECTION 3 ADDITION BEFORE COOKING (EXCESS AMOUNT OF WATER) | TEST SECTION 4 ADDITION AFTER COOKING (EXCESS AMOUNT OF WATER) |
| OVERALL ASSESSMENT INCLUDING FLAVOR AND PROPERTIES OF "SUSHI RICE" (AFTER 24 HOURS) | ◎ | ◎ | ◎ | ◎ |
| OVERALL ASSESSMENT OF PHYSICAL PROPERTIES OF "WHITE RICE" AND "SUSHI RICE" (AFTER 24 HOURS) | ○ | ○ | ◎ | ◎ |
| OVERALL ASSESSMENT INCLUDING FLAVOR/PROPERTIES SUSTAINING EFFECT (AFTER 24 HOURS) | ◎ | ◎ | ◎ | ◎ |
| OVERALL ASSESSMENT INCLUDING FLAVOR/PROPERTIES SUSTAINING EFFECT (AFTER 48 HOURS) | ○ | ○ | ◎ | ◎ |
| OVERALL ASSESSMENT INCLUDING FLAVOR/PROPERTIES SUSTAINING EFFECTS (AFTER 72 HOURS) | ○ | ○ | ○ | ○ |

It should be noted that the values shown in the items of "addition (of improver) before cooking" and "addition of improver (after cooking)" show the adding amount of the liquid cooked-rice improver as the ratio (%) of dry mass of the sum of the low-decomposition starch and the dextrin with respect to the raw rice.

As shown in Table 4, in the comparison between the test section 1 and the test section 2, there was no clear difference in the sustaining effects of the flavor and physical properties of the cooked rice. That is, similar effects were achieved by adding the cooked-rice improver after or before cooking. Further, in the comparison among the test section 1, test section 3, and test section 4, there was no clear difference in the flavor sustaining effects of the cooked rice. Besides, when the cooked rice was produced under the condition in which the amount of water added thereto was 1.55 pts. mass (i.e., excess amount of water) per one pt. mass of the raw rice, the flavor enhancement effect was confirmed regardless of whether the addition of cooked-rice improver was before cooking or after cooking. Further, with the storage of the cooked rice for over 24 hours, the flavor sustaining effect of the cooked rice and/or the flavor enhancement effect of the cooked rice were confirmed. It should be noted that in the above-described Evaluation Tests, the low-decomposition starch obtained from waxy cornstarch and the dextrin were used as the raw starch. Although it will not be described herein, similar results were confirmed in Evaluation Tests with rice starch and potato starch. That is, it has been confirmed that the effects can be achieved regardless of the kinds of the raw starch. Furthermore, although it will not be described herein, similar results were confirmed in Evaluation Tests with processed starch. That is, it has been confirmed that the effects can be achieved regardless of the kinds of the starch and the decomposition methods.

INDUSTRIAL APPLICABILITY

This invention is applicable to the usage in the food industry of supermarkets and/or convenience stores as the invention can make the cooked rice for "ready-made meal" realize nearly fresh flavor.

The invention claimed is:
1. A cooked-rice, flavor-improving composition comprising:
    (a) a starch having a weight average molecular weight of 500,000 to 4,000,000 daltons, in an amount of 20-60 wt % of the composition, and
    (b) a dextrin having a dextrose equivalent (DE) value of from 1 to 15 in an amount of 40-80 wt % of the composition.
2. The cooked-rice flavor-improving composition according to claim 1, wherein the cooked rice flavor-improving composition is in the form of a powder excluding water or a seasoning liquid.
3. The cooked-rice flavor-improving composition according to claim 1, wherein the cooked rice flavor-improving composition is in the form of a powder excluding water or a seasoning liquid, and wherein a percentage of the powdered cooked-rice improver left on a sifter with a 0.5 mm opening is less than 5%.
4. A method of producing a powdered cooked-rice flavor-improving composition comprising:
    mixing starch having a weight average molecular weight of 500,000 to 4,000,000 daltons and dextrin having a DE value of from 1 to 15, wherein the low decomposition starch is in an amount of 20-60 wt % of the composition and the dextrin is an amount of 40-80 wt % of the powdered cooked-rice flavor-improving composition.
5. A liquid cooked-rice improver comprising:
    the cooked-rice flavor-improving composition according to claim 1 dissolved in water or a seasoning liquid.
6. The liquid cooked-rice improver according to claim 5, wherein the liquid cooked-rice improver is an oil-and-emulsification-free liquid.
7. A method of producing a liquid cooked-rice improver comprising:
    adding the cooked-rice flavor-improving composition according to claim 1 into water or into a seasoning liquid.
8. The method of producing the liquid cooked-rice improver according to claim 7, wherein the liquid cooked-rice improver is an oil-and-emulsification-free liquid.
9. A method of producing cooked rice in which the flavor thereof has been improved, comprising:

adding an amount of the cooked-rice flavor-improving composition according to claim 1 in the form of a powder or a liquid cooked-rice improver comprising the cooked-rice flavor-improving composition according to claim 1 dissolved in water or a seasoning liquid and water or seasoning liquid to rice, wherein a dry mass of a sum of the low-decomposition starch and the dextrin with respect to raw rice is within a range of 0.001% to 1.0%.

10. The method of producing the cooked rice according to claim 9, wherein the powdered cooked-rice flavor-improving composition or the liquid cooked-rice improver is added to the raw rice before production or to the cooked rice after production.

11. The method according to claim 9, wherein an amount of added water per one pt mass of the raw rice during the production of cooked rice is equal to or more than 1.3 pts. mass and equal to or less than 1.8 pts. mass.

12. The method according to claim 9, wherein the rice is sushi rice.

13. Cooked rice in which the flavor thereof has been improved, the cooked rice comprising:

the cooked-rice flavor-improving composition according to claim 1, the cooked-rice flavor-improving composition according to claim 1 in the form of a powder, or the cooked-rice flavor-improving composition of claim 1 dissolved in water or a seasoning liquid, wherein a dry mass of a sum of the low-decomposition starch and the dextrin with respect to raw rice is within a range of 0.001% to 1.0%.

14. The rice according to claim 13, wherein the rice is sushi rice.

15. A method of improving flavor of rice, comprising adding the cooked-rice flavor-improving composition according to claim 1 in the form of a powder or a liquid cooked-rice improver comprising the cooked-rice flavor-improving composition according to claim 1 dissolved in water or a seasoning liquid to rice, wherein a dry mass of a sum of the starch and the dextrin with respect to raw rice is within a range of 0.001% to 1.0%.

16. The cooked-rice flavor-improving composition according to claim 1, wherein said starch is obtained by subjecting non-processed starch to a molecular weight-reducing treatment through one or more treatments selected from the group consisting of enzymatic treatment and a physical processing treatment.

17. The cooked-rice flavor-improving composition according to claim 1, wherein said dextrin is obtained by subjecting starch or processed starch to a molecular weight-reducing treatment.

* * * * *

UNITED STATES PATENT AND TRADEMARK OFFICE
CERTIFICATE OF CORRECTION

| | | |
|---|---|---|
| PATENT NO. | : 12,171,250 B2 | Page 1 of 1 |
| APPLICATION NO. | : 15/769960 | |
| DATED | : December 24, 2024 | |
| INVENTOR(S) | : Kenta Hagiwara | |

It is certified that error appears in the above-identified patent and that said Letters Patent is hereby corrected as shown below:

In the Specification

Column 21-22, Line 6-7 (TABLE 4), delete "(NORMAL AMOUN T OF" and insert -- (NORMAL AMOUNT OF --.

In the Claims

Column 24, Line 47-48, Claim 4, delete "the low decomposition starch" and insert -- the starch --.

Column 25, Line 16, Claim 11, delete "one pt mass" and insert -- one pt. mass --.

Signed and Sealed this
Twenty-fifth Day of February, 2025

Coke Morgan Stewart
*Acting Director of the United States Patent and Trademark Office*